United States Patent
Bachu et al.

(10) Patent No.: US 7,899,051 B2
(45) Date of Patent: Mar. 1, 2011

(54) BROADCAST CHANNEL SIGNAL, APPARATUS AND METHOD FOR TRANSMITTING AND DECODING BROADCAST CHANNEL INFORMATION

(75) Inventors: Raja S. Bachu, Somerset, NJ (US);
Michael E. Buckley, Grayslake, IL (US); Kenneth A. Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 259 days.

(21) Appl. No.: 11/967,971

(22) Filed: Dec. 31, 2007

(65) Prior Publication Data

US 2009/0168927 A1 Jul. 2, 2009

(51) Int. Cl.
*H04L 27/06* (2006.01)
*H04W 4/00* (2009.01)
(52) U.S. Cl. .................. 370/390; 370/328; 370/349
(58) Field of Classification Search .............. 370/328, 370/329, 349, 390, 342; 455/61, 515, 517, 455/560, 561; 375/341
See application file for complete search history.

(56) References Cited

U.S. PATENT DOCUMENTS

| | | | |
|---|---|---|---|
| 5,319,712 A | | 6/1994 | Finklestein et al. |
| 6,067,444 A | | 5/2000 | Cannon et al. |
| 6,097,772 A | | 8/2000 | Johnson et al. |
| 6,360,345 B1 | | 3/2002 | Kim et al. |
| 6,392,572 B1 | | 5/2002 | Shiu et al. |
| 6,788,959 B2 * | | 9/2004 | Jokinen et al. ........... 455/552.1 |
| 7,058,407 B2 * | | 6/2006 | Chi et al. ................... 455/449 |
| 7,243,285 B2 * | | 7/2007 | Foisy et al. ................ 714/752 |
| 7,260,764 B2 | | 8/2007 | Chen |
| 7,711,068 B2 * | | 5/2010 | Shokrollahi et al. ......... 375/296 |
| 2002/0056064 A1 | | 5/2002 | Kidorf et al. |

(Continued)

FOREIGN PATENT DOCUMENTS

EP       1811674 A1      7/2007

(Continued)

OTHER PUBLICATIONS

3GPP TSG-GERAN Meeting #25, GP-015429 Jun. 20-24, 2005.

(Continued)

*Primary Examiner*—Chi H Pham
*Assistant Examiner*—Ahmed Elallam
(74) *Attorney, Agent, or Firm*—Lawrence J. Chapa

(57) ABSTRACT

The present invention provides a broadcast channel signal, a wireless communication device and method for transmitting broadcast channel information, where an invariant subportion of a variant portion of the broadcast channel information is separated from the variant subportion of the variant portion and combined with the invariant portion, and encoded separately from the variant subportion. Both encoded portions are transmitted and decoded by a wireless communication device, which uses subsequent transmissions of the broadcast channel information to assist in the decoding in the event the broadcast channel information for a particular transmission frame of a transmission interval cannot be decoded. If the variant subportion cannot be decoded, then using one or more of a set of prestored possible matches defining anticipated bit differences, between multiple successive transmissions, based upon the relative transmission sequence, which can be negated as part of attempting to decode and combine the received information for the multiple received frames.

20 Claims, 5 Drawing Sheets

U.S. PATENT DOCUMENTS

| | | | |
|---|---|---|---|
| 2002/0159545 | A1 | 10/2002 | Ramesh et al. |
| 2002/0172261 | A1 | 11/2002 | Hershey et al. |
| 2003/0072286 | A1 | 4/2003 | Kim et al. |
| 2003/0112780 | A1 | 6/2003 | Ouyang et al. |
| 2004/0225940 | A1 | 11/2004 | Kerr et al. |
| 2005/0003831 | A1 | 1/2005 | Anderson |
| 2005/0030964 | A1 | 2/2005 | Tiedemann, Jr. et al. |
| 2005/0276249 | A1 | 12/2005 | Damnjanovic et al. |
| 2005/0276266 | A1 | 12/2005 | Terry |
| 2007/0042794 | A1 | 2/2007 | Fischer |
| 2008/0039133 | A1* | 2/2008 | Ma et al. ............... 455/552.1 |
| 2008/0072269 | A1* | 3/2008 | Malladi et al. ............ 725/110 |
| 2008/0186885 | A1* | 8/2008 | Athalye et al. ............ 370/310 |
| 2008/0316995 | A1* | 12/2008 | Bachu et al. ............... 370/345 |
| 2008/0320527 | A1* | 12/2008 | Bachu et al. ............... 725/62 |
| 2009/0149207 | A1* | 6/2009 | Zhang et al. ............... 455/500 |

FOREIGN PATENT DOCUMENTS

| | | | |
|---|---|---|---|
| EP | 1811711 | A1 | 7/2007 |
| GB | 2418571 | A | 3/2006 |
| WO | 9825360 | A | 6/1998 |
| WO | 9927745 | A | 6/1999 |
| WO | 0062467 | A | 10/2000 |
| WO | 2007087511 | A2 | 8/2007 |
| WO | 2007087512 | A2 | 8/2007 |

OTHER PUBLICATIONS

3GPP TS 44.0.05 V7.0.0; Nov. 2005; 32 pages.
3GPP TS 44.0.06 V6.2.0; Nov. 2005; 59 pages.
Motorola: "R2-061459 System Broadcast" Internet Citation May 3, 2006.
Public Email Discussion Forum: 3GPP_TSG_RAN_WG1@LIST.ETSI.ORG, Discussion Group; Chmiel, M. Jun. 11, 2007 8:49 AM.
Public Email Discussion Forum: 3GPP_TSG_RAN_WG1@LIST.ETSI.ORG, Discussion Group; Buckley, M. Jun. 11, 2007 8:47 PM.
Public Email Discussion Forum: 3GPP_TSG_RAN_WG1@LIST.ETSI.ORG, Discussion Group; Shiego, T. Jun. 12, 2007 10:19 PM.
Public Email Discussion Forum: 3GPP_TSG_RAN_WG1@LIST.ETSI.ORG, Discussion Group; Jianglei, M. Jun. 13, 2007 8:35 AM.
Public Email Discussion Forum: 3GPP_TSG_RAN_WG1@LIST.ETSI.ORG, Discussion Group; Dahlman, E. Jun. 13, 2007 9:27 AM.
Public Email Discussion Forum: 3GPP_TSG_RAN_WG1@LIST.ETSI.ORG, Discussion Group; Jianglei, M. Jun. 14, 2007 3:53 PM.
Public Email Discussion Forum: 3GPP_TSG_RAN_WG1@LIST.ETSI.ORG, Discussion Group; Onggosanusi, E Jun. 15, 2007 12:39 AM.
Public Email Discussion Forum: 3GPP_TSG_RAN_WG1@LIST.ETSI.ORG, Discussion Group; Chmiel, M. Jun. 15, 2007 2:12 AM.
Public Email Discussion Forum: 3GPP_TSG_RAN_WG1@LIST.ETSI.ORG, Discussion Group; Joonyoung, C. Jun. 18, 2007 7:07 AM.
Annamalai A et al: "Analysis of Unslotted Direct-Sequence Spread Spectrum Multiple Access Network with Packet combining" XP006007997, pp. 1673-1674.
Miyagi M et al: "Selective Repeat Type-II Hybrid Fec/ARG Systems Using Concatenated Codes" XP000425130, pp. 25-34.
3GPP TS 25.212 V6.7.0, Dec. 2005; 84 pages.
3GPP TSG RAN WG1 #49 Meeting, Kobe, Japan, May 7-11, 2007 R1-072265.
IEEE Transactions on Information Theory, vol. IT-13, No. 2, Apr. 1967.
Annamalai A et al: "Analysis of Unslotted Direct-Sequence Spread Spectrum Multiple Access Network with Packet combining" XP006007997, pp. 1673-1674, Sep. 25, 1997.
Miyagi M et al: "Selective Repeat Type-II Hybrid Fec/ARG Systems Using Concatenated Codes" XP000425130, pp. 25-34, Electronics and communication in Japan, Part I, vol. 76, No. 6, Jun. 1993.
A. Sanderovich, et al., "LDPC Coded MIMO Multiple Access with Iterative Joint Decoding", IEEE Transactions on Information Theory, Apr. 2005, vol. 51, No. 4, pp. 1.
A. Viterbi, "Error Bounds for Convolutional Codes and an Asymptotically Optimum Decoding Algorithm", IEEE Transactions Information Theory, Apr. 1967, vol. IT-13, No. 2.
European Patent Office, "Communication Pursuant to Article 94(3) EPC", Dec. 2, 2009, pp. 1-4 06 300 059.0 - 1247.

* cited by examiner

BROADCAST CHANNEL SIGNAL, APPARATUS AND METHOD FOR TRANSMITTING AND DECODING BROADCAST CHANNEL INFORMATION

FIELD OF THE INVENTION

The present invention relates generally to the management of the transmission and receipt of channel information and, more particularly, to the management of the transmission and receipt of channel information having variant and invariant information pertaining to a broadcast control channel in a wireless communication system.

BACKGROUND OF THE INVENTION

A broadcast control channel is typically a downlink channel received from the network infrastructure that contains specific parameters needed by a mobile subscriber in order for the mobile subscriber to identify the network and gain access to it. Often times, the broadcast control channel assists the mobile in translating between a logical and a physical channel, where the broadcast control channel will sometimes include frequency and timing information, that assist in accessing the network infrastructure's other channels.

Because of the importance of the broadcast control channel information in establishing a wireless communication link between the mobile subscriber and the network infrastructure, it is beneficial to organize and arrange the control channel information so as to enhance the reliability of the communication of the broadcast channel information. In at least some instances, the data will be encoded so as to include error detection and error correction information, as well as transmit information redundancies.

In at least some instances, the broadcast control channel information will be organized and arranged to be communicated during transmission intervals, where some of the broadcast control channel information may be communicated multiple times during which at least some of the information will remain the same or static. Each separate transmission within a transmission interval is sometimes embedded within a specific subinterval of the transmission interval referred to as a frame, where all or some of the frames associated with a particular broadcast communication channel, herein referred to as an active frame, may include broadcast control channel information. In some instances, some of the broadcast control channel information may vary between frames.

For example, information such as channel bandwidth, base station, and reference power levels, which may be periodically transmitted via a broadcast control channel may be defined as remaining static and/or invariant for the duration of a transmission interval. Other information such as system frame number, which corresponds to a system time reference may be allowed to vary between frames, even within a transmission interval.

In at least some proposals, the static information may be encoded using various transmission configurations, which define the conditions under which and the nature of a combination of encoding, modulating, interleaving and scrambling is performed, which in at least some instances can serve to further assist in the reliable receipt of the same. Multiple static retransmissions of the encoded data using the same or related transmission configurations can be used to allow for the combining of the received information by the mobile station across multiple transmissions or active frames within a particular transmission interval. However, the incorporation and/or encoding of some information that varies between frames can make the combining of multiple transmissions across multiple active frames of a transmission interval more difficult, as it is not always clear to the receiver how the varying data might affect the format after encoding between active frames during which the broadcast channel information is being transmitted. As a result, information that varies between frames is sometimes excluded from some encodings, which are used to enhance the reliability of the information being communicated.

The applicants have recognized that it is possible to sometimes identify invariant subportions of generally variant information, and include the invariant subportions with the other non-varying data that is being encoded. The variant subportion of the variant portion can then be separately encoded, and subsequently decoded upon receipt by a wireless communication device receiving the transmission. When the encoded variant subportion of the variant portion cannot be decoded based upon the reception of a single transmitted frame, the receiving device can receive successively transmitted frames, and further attempt to decode the transmissions using one or more of a set of prestored possible matches defining anticipated bit differences, between multiple successive transmissions, based upon the relative transmission sequence. The bit differences can then be negated in accordance with each of the one or more of the set of prestored possible matches as part of attempting to decode and combine the received information for the multiple received frames. For the combined invariant portion and invariant subportion, there are no bit differences to take into account when attempting to decode and combine the received information from the multiple received frames.

SUMMARY OF THE INVENTION

The present invention provides a method for transmitting broadcast channel information as part of a broadcast channel signal in a wireless communication system. The broadcast channel signal has one or more transmission intervals, each transmission interval including a plurality of transmissions, where one or more of the transmissions are active frames in which the broadcast channel information to be transmitted as part of each broadcast channel signal includes an invariant portion that remains static for each of the active frames within a particular transmission interval, and a variant portion that predictably changes with each successive active frame. The method includes subdividing the variant portion into an invariant subportion and a variant subportion, where the variant subportion includes at least one bit which changes value within the particular transmission interval. The invariant portion is then combined with the invariant subportion of the variant portion. The combined invariant portion and invariant subportion of the variant portion is then encoded. The variant subportion is then encoded, separate from the combined invariant portion and invariant subportion of the variant portion. The encoded combined invariant portion and invariant subportion of the variant portion, and the separately encoded variant subportion for each active frame of each transmission interval is then transmitted in succession thereby forming the broadcast channel signal.

In at least one embodiment, attempting to decode the broadcast channel information includes attempting to decode the combined invariant portion and invariant subportion of the variant portion, and attempting to decode the variant subportion of the variant portion.

If the combined invariant portion and invariant subportion of the variant portion associated with a particular active frame can not be decoded, then receiving one or more further successively transmitted active frames, and attempting to decode and combine multiple frames including the particular active frame and the one or more further successively transmitted active frames.

If the variant subportion of the variant portion associated with a particular active frame can not be decoded, then receiving one or more further successively transmitted active frames, and attempting to match each of the particular active frame and the one or more further successively transmitted active frames to a prestored set of possible matches based upon each of the available combination of values for the variant subportion of the variant portion, where the possible matches are consistent with the relative transmission sequence of each of the active frames, which are being attempted to be combined and the corresponding possible values.

The present invention further provides a broadcast channel signal. The broadcast channel signal includes one or more transmission intervals, each transmission interval including a plurality of transmissions. One or more of the transmissions are active frames in which broadcast channel information to be transmitted as part of each broadcast channel signal includes an invariant portion that remains static for each of the active frames within a particular transmission interval, and a variant portion that predictably changes with each successive active frame. The variant portion includes an invariant subportion and a variant subportion. The variant subportion is subdivided from the invariant subportion and encoded separately, and the invariant subportion is combined with the invariant portion and encoded together.

The present invention still further provides a wireless communication device. The wireless communication device includes a receiver for receiving a wireless communication signal in the form of one or more transmission intervals, where each transmission interval includes a plurality of transmissions, where one or more of the transmissions are active frames. The wireless communication further includes a decoder for converting the received signal into data intended to be transmitted prior to an encoding for transmission. The decoder includes a controller, where the controller is adapted to attempt to decode multiple separately encoded portions of each active frame as it is received, where one separately encoded portion includes a variant portion of the data intended to be transmitted, which changes between multiple active frame transmissions within a particular transmission interval, and another separately encoded portion includes an invariant portion of the data intended to be transmitted, which does not change between multiple active frame transmissions within the particular transmission interval. As part of decoding a particular active frame, part of the decoded invariant portion is associated with at least part of the decoded variant portion.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
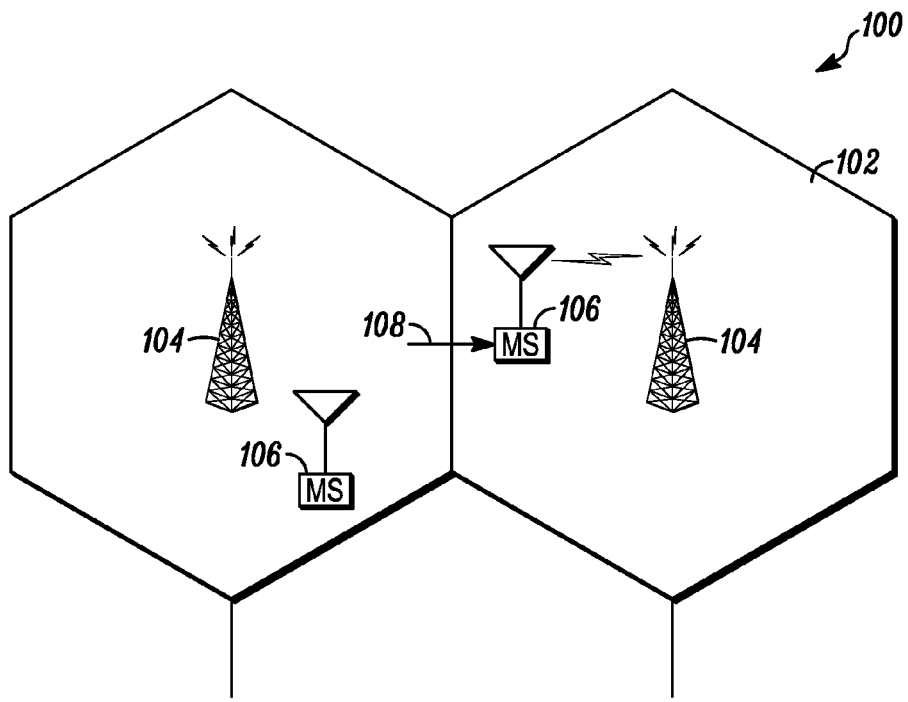
FIG. 1 is an exemplary topographical view of a geographical region representing at least a portion of the coverage area for a wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view of at least a portion of a wireless communication system. The topographical view 100 includes a plurality of cells 102 pictorially represented as adjacent hexagons. The hexagons are only rough approximations of the footprint or area of coverage associated with each of a plurality of cellular regions, where in reality the area of transmission is not so uniformly defined. Each cell is typically served by one or more base transceiver stations (BTS) 104, referred to as a serving station, which communicates with mobile subscriber (MS) 106, such as a mobile wireless communication device, located and/or traveling 108 within the corresponding cell 102.

Figure 2:
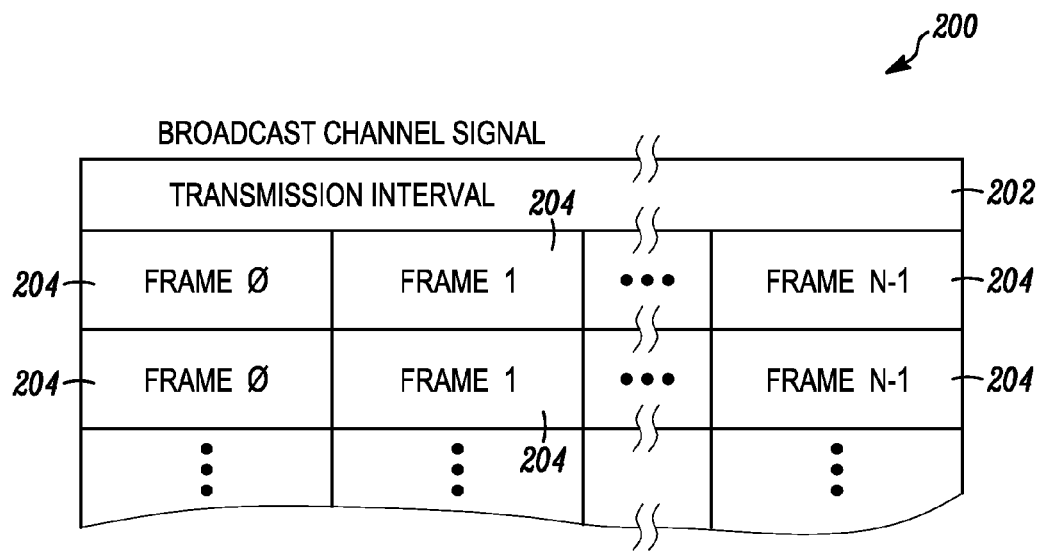
FIG. 2 is a block diagram of a broadcast channel signal.

As a mobile subscriber 106 powers on or enters a new cell, a mobile subscriber will need to acquire the signaling information associated with the new cell. In many cases, this will involve monitoring one or more broadcast control channels, so as to allow the mobile station to obtain synchronization, timing and/or other related information consistent with establishing communication capabilities with the new cell. Because control channel reception is often a precursor for establishing other forms of communication with a particular cellular area, a more robust and/or effective manner in establishing a communication connection and receiving the information being conveyed by the broadcast control channel is desirable. The broadcast channel signal 200 is arranged in one or more transmission intervals 202, which each includes a plurality of transmissions or frames 204, where one or more of the transmissions are active frames in which broadcast channel information is transmitted. In the embodiment illustrated in FIG. 2, a transmission interval 202 coincides with a row of N frames, where N is an integer value.

In some cases, the broadcast channel signal will be encoded as part of each frame in a transmission interval. In other instances, it is possible that broadcast channel information will be transmitted on fewer than all of the corresponding frames. As noted above, frames in which broadcast channel information is transmitted as part of the transmission frame are identified in the present application as active frames. By transmitting on fewer than all of the frames associated with a particular transmission interval, the frames which do not support transmission of the broadcast channel signal, can be made available to other forms and/or types of data transmission.

In some instances it may be desirable to combine multiple active frames to more quickly and/or better receive the information being conveyed via the broadcast channel signal. Hence, the repeated transmission of at least some broadcast channel information across multiple active frames within a particular transmission interval. However, not all information can be readily repeated, where for example, in at least one discussed proposal, the broadcast information includes a system frame number that varies with each frame transmission.

Generally, broadcast channel information often includes both an invariant portion and a variant portion. However, even some subportions of the variant portion can be invariant. Furthermore, by more specifically controlling the relationship between the value of the variant portion, such as the system frame number, with respect to the beginning boundary value of the transmission interval and more specifically controlling the number of transmissions or frames in a transmission interval, the number of variant information bits in the variant subportion of the variant portion can be better managed. For example numbering the system frames, so that the frame number of the first frame after the beginning boundary of the transmission interval has a modulus n value that is equal to zero, where n is the number of transmissions (i.e. frames) in the transmission interval, can minimize the number of bits across which the system frame number might have a different bit value in any two transmissions in a particular transmission interval. In such an instance, the system frame number can predictably change, and in at least one embodiment of the present invention, increments by one in each adjacent subsequent frame. However, one skilled in the art will readily recognize the value of the present invention regardless as to whether the value of the system frame number is defined to increment for adjacent subsequently transmitted frames, as noted above, where alternatively a properly defined predetermined predictable sequence can also benefit from the teachings of the present invention, if the system frame values from which the frames in a particular transmission interval are assigned and are selected from a list of values where a predefined predictable set of bits are allowed to change within the particular transmission interval.

Figure 3:
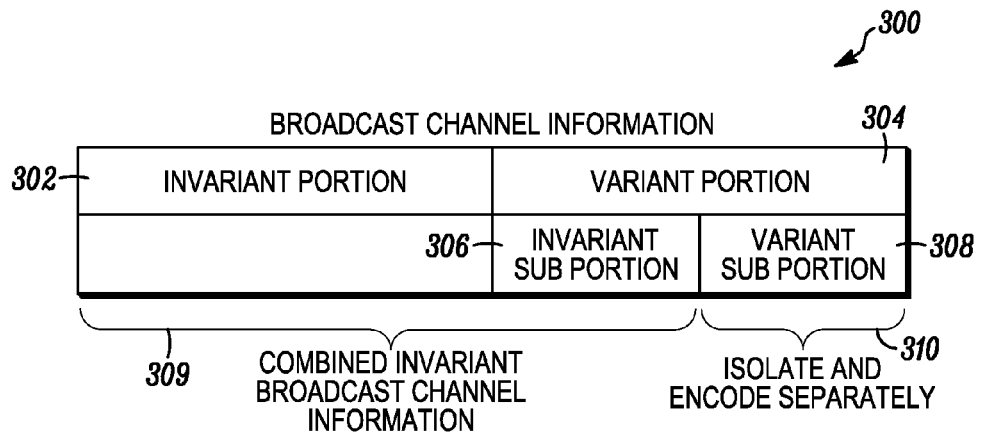
FIG. 3 is a block diagram of broadcast channel information, which forms the basis of the information encoded and used to form an active frame for transmission, in accordance with at least one embodiment of the present invention.

FIG. 3 illustrates broadcast channel information 300, in accordance with at least one aspect of the present invention, where generally, the broadcast channel information 300 will include an invariant portion 302 and a variant portion 304, where the variant portion 304 to the extent that all of the bits do not change or do not need to change within a transmission interval 202 is further subdivided into an invariant subportion 306 and a variant subportion 308. Together the invariant portion 302 and the invariant subportion 306 are identified and can be combined, thereby forming combined invariant broadcast channel information 309, which in turn can be encoded without including the variant subportion 308. The variant subportion 308 can then be separately encoded after having been removed or isolated 310 from the invariant subportion of the variant portion. In the illustrated embodiment the variant subportion generally coincides with the least significant bits, which are likely to change between frames. In at least some instances, the varying least significant bits have a corresponding value associated with the frame number relative to the beginning of a first frame of the particular transmission interval, which begins with zero and counts incrementally for each subsequent adjacent frame.

In the illustrated embodiment, the variant subportion represents an isolation of the part of the variant portion that changes, where the predictable difference between adjacent successively transmitted active frames is generally known and allows for one of a set of predictable bit differences, which can be negated during the decoding, when attempting to subsequently decode based upon the subsequent combining of the multiple received encoded transmissions.

With regards to decoding a received active frame, the wireless communication device can attempt to decode the encoded data. Nevertheless, in some circumstances, it may not be possible to decode the broadcast channel information 300, based upon the receipt of a single active frame. In these instances, upon receipt of a subsequent active frame, the earlier received active frame and the latter received active frame can be used to attempt to combine and decode the multiple received transmissions. In this instance the wireless communication device can make one or more assumptions regarding the position of the frame relative to the beginning boundary of the transmission interval, and then determine an appropriate bit difference values to apply to one of the signals received in the pair of active frames, where the purpose is an attempt to negate any differences between the two received signal values. In some instances, the wireless communication device can cycle through each possible assumption, which may result in a different predictable bit difference being applied, based upon an understanding of the relationship of the two active frames being combined prior to transmission. An attempt to decode is then made.

The process can be further repeated as necessary to include still further additional active frames, in the attempt to combine and decode. Alternatively, in the event that any of the earlier received active frames are determined to be preferably excluded from further attempts to combine, the same can be eliminated from the current set of received signals from active frames that are being considered. At least one reason to exclude an earlier received active frame may be based upon a belief or an understanding that the invariant broadcast channel information may only be invariant across the transmission of the active frames of a particular transmission interval, such that one might exclude an earlier received active frame on the assumption that it was potentially part of a different earlier transmission interval across which an invariance of the broadcast channel information between different active frames can not be confirmed. It is also possible however, to readily extend the method of combining and decoding based on assumptions concerning the state of the invariant and variant broadcast information to include the case where the receiver makes a further assumption that the portion of the broadcast information that is invariant within a transmission interval also does not change from one transmission interval to the next.

Figure 4:
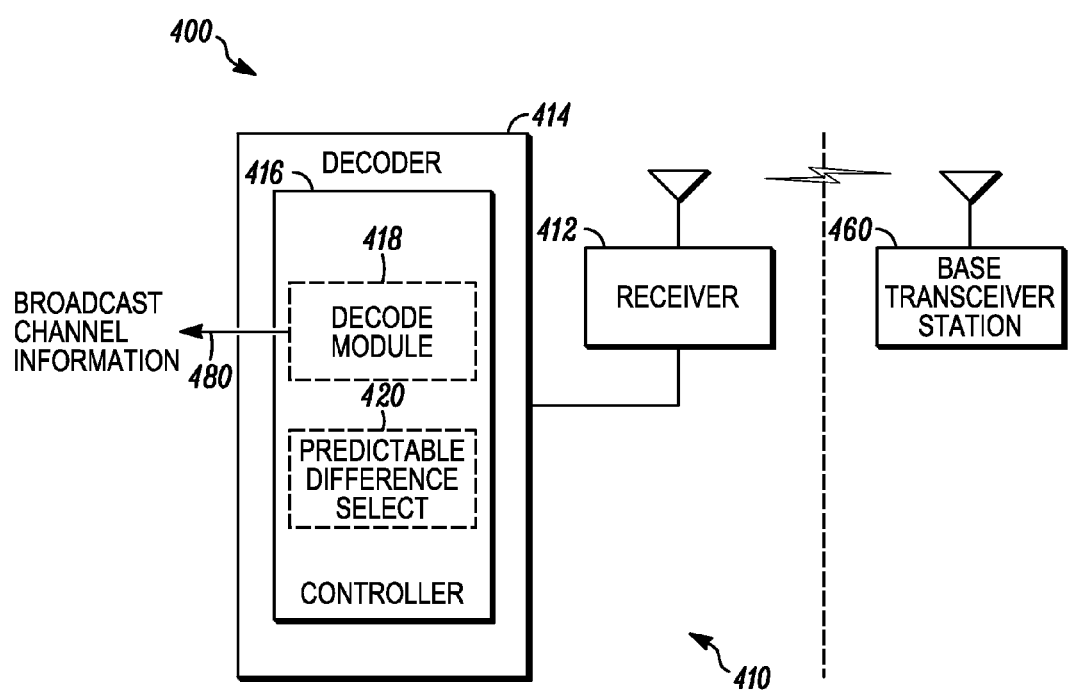
FIG. 4 is a block diagram of a wireless communication device, such as a mobile subscriber, and the portion of the cellular network infrastructure with which the communication device more directly communicates in connection with the receipt of a broadcast channel signal.

FIG. 4 illustrates a block diagram 400 of a wireless communication device 410, such as a mobile subscriber, and the portion of the cellular network infrastructure 460 with which the wireless communication device 410 more directly communicates in connection with the receipt of a broadcast channel signal 200. The wireless communication device 410 includes a receiver 412 for receiving a wireless communication signal. The wireless communication device 410 further includes a decoder 414 for converting the received wireless communication signal into broadcast channel information 480, which was intended to be transmitted in connection with the encoding for transmission.

The decoder 414 further includes a controller 416 including a decode module 418, which is adapted to attempt to decode each active frame of the received wireless communication signal, as it is received using a decoding sequence, respectively corresponding to a transmission specific configuration governing the original encoding. The controller additionally includes a predictable bit difference select 420, which is adapted to identify an assumed predictable bit difference in the encoded value between a pair of received signals associated with a pair of active frames for the portions of the frame that vary between their respective successive transmissions. For the present purpose, a decoding sequence means a sequence of receiver processing operations designed in complementary fashion to the assumed transmitter configuration used to encode the broadcast channel information, i.e. a sequence of operations (in the order appropriate to the transmitter configuration) of de-encoding, de-modulating, de-interleaving and de-scrambling. Similarly, the decoder 414 of the wireless communication device 410 can be used to attempt to decode a combination of multiple active frames in the event that the decoder 414 is unable to decode a single received active frame.

Figure 5:
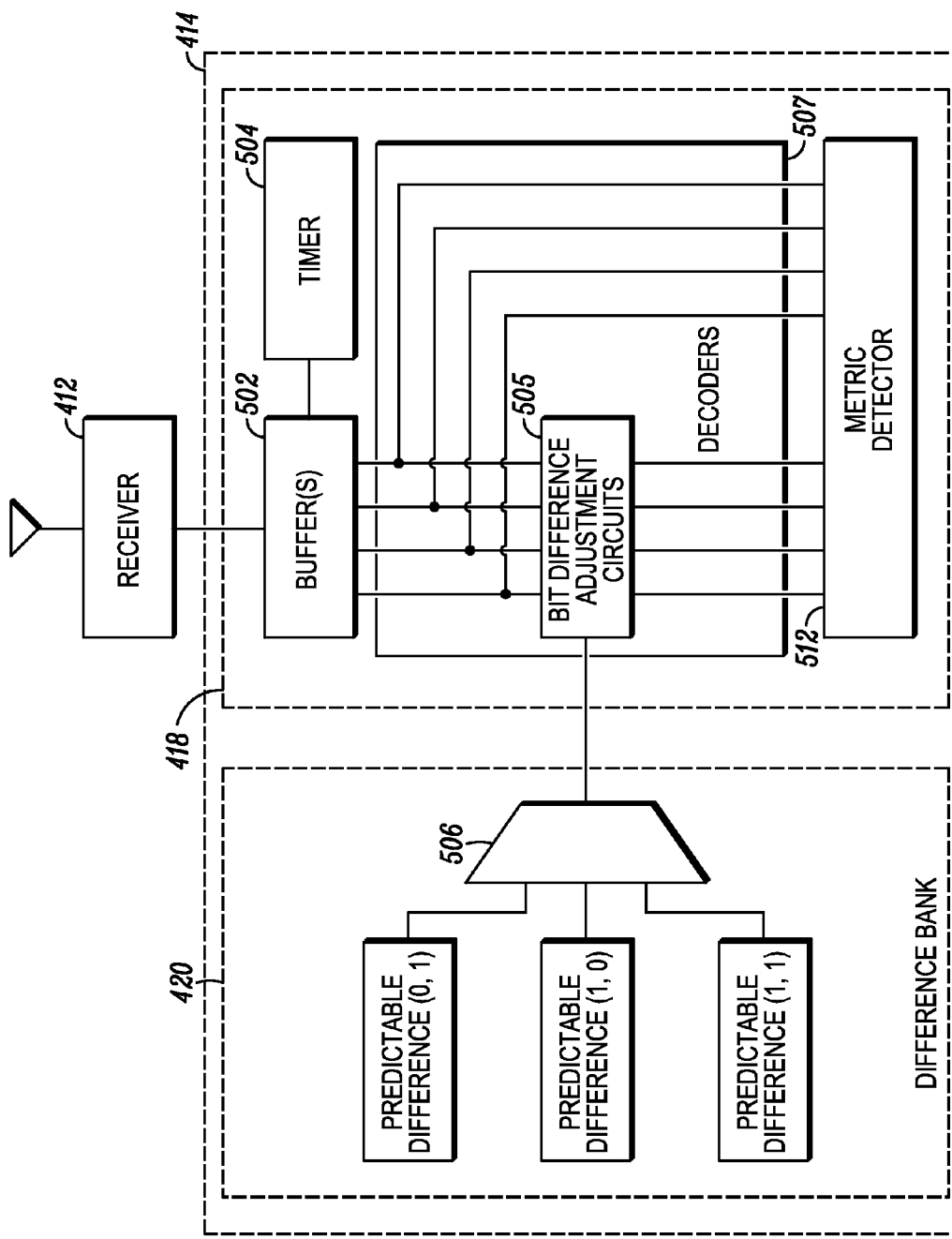
FIG. 5 is a more detailed block diagram of a mobile subscriber for use in receiving a wireless communication signal, and decoding the same, in accordance with at least one embodiment of the present invention.

FIG. 5 illustrates a more detailed block diagram 500 of a mobile subscriber for use in receiving a wireless communication signal, and decoding the same, in accordance with at least one embodiment of the present invention. Similar to the wireless communication device 400 illustrated in FIG. 4, the mobile subscriber includes a receiver 412 for receiving a wireless communication signal, which is coupled to decoder 414. The decoder includes a decode module 418 and a predictable bit difference select module 420. The decode module 418 includes one or more buffers 502 for storing active frames that have been previously received. A timer 504 provides a relative temporal relationship of the active frames received, such that a more accurate association can be made relative to the decoding of other received active frames, in view of an assumption relative to a first received active frame. This can account for instances in which intermediate active frames between two received active frames may not have been received and/or transmitted for one or more reasons.

The buffers 502 are coupled to decoder(s) 507 including one or more bit difference adjustment circuits 505, which are adapted to selectively separately apply one of one or more predictable differences to each of the wireless communication signals corresponding to the variant subportion of the received broadcast channel information that has been received and is stored in the one or more buffers 502, and generally at least partially decoded. The separate selective application of one or more predictable differences can be accomplished via a demultiplexor 506 coupled to definitions for one or more predictable bit differences 508, based upon a set of known differences in the broadcast channel information prior to encoding. The combined invariant broadcast information 309, including the invariant portion 302 and the invariant subportion 306 of the variant portion 304, as part of the decoding can typically bypass the one or more bit difference adjustment circuits 505 as there are generally no predictable differences to account for.

Upon attempting to decode the active frames that have been previously received, the attempted decodings are then applied to a metric detector 512, which identifies the threshold at which a match associated with a successful decoding is confirmed. This may include e.g. checking a cyclic redundancy check code.

Figure 6:
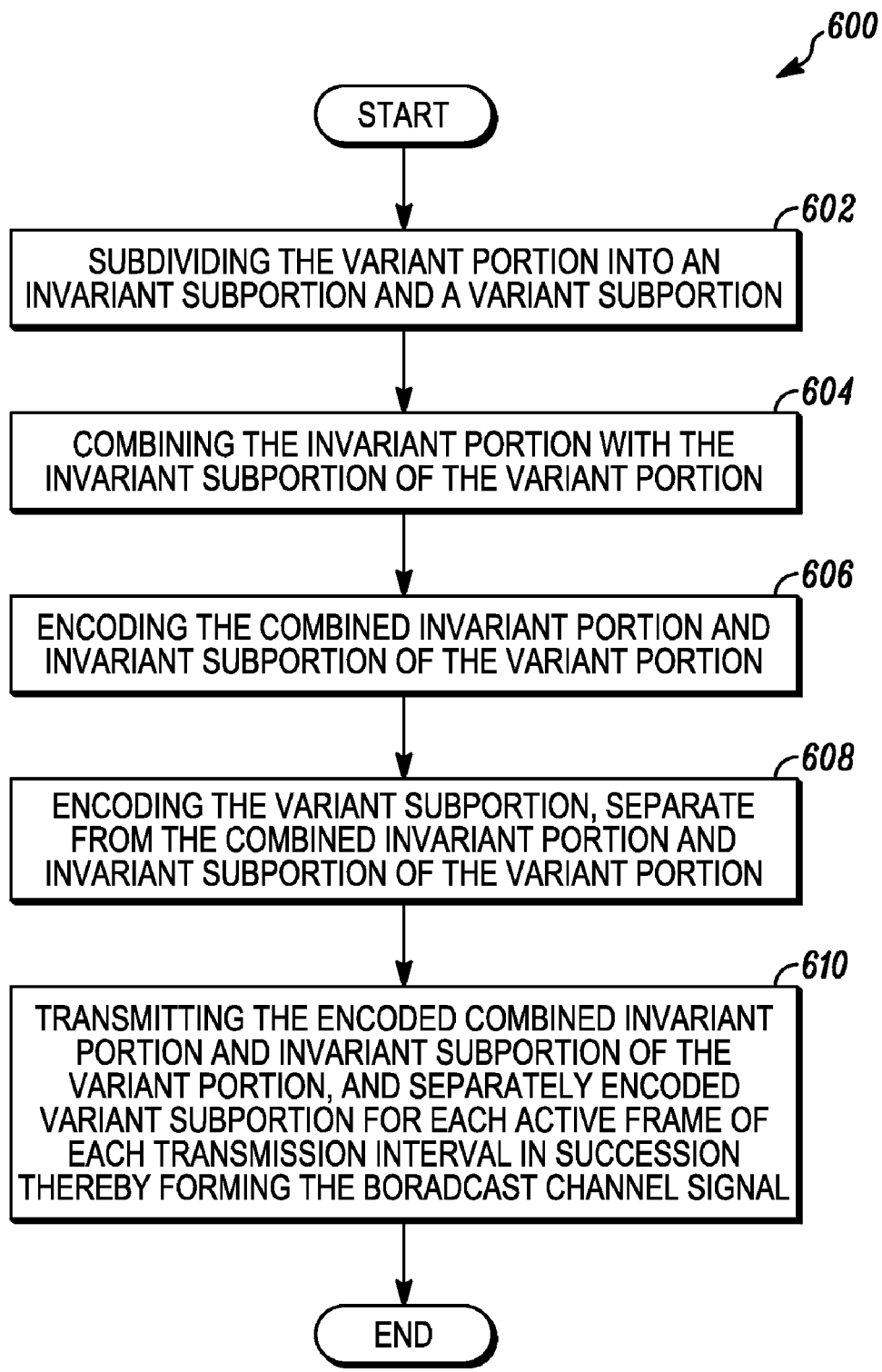
FIG. 6 is a flow diagram of a method of transmitting broadcast channel information as part of a broadcast channel signal in a wireless communication system, in accordance with at least one aspect of the present invention.

FIG. 6 illustrates of a method 600 of transmitting broadcast channel information as part of a broadcast channel signal in a wireless communication system. The method includes subdividing 602 the variant portion into an invariant subportion and a variant subportion. The invariant portion is then combined 604 with the invariant subportion of the variant portion. The combined invariant portion and invariant subportion of the variant portion are then encoded 606. The variant subportion of the variant portion is then encoded 608, separate from the combined invariant portion and invariant subportion of the variant portion. The encoded combined invariant portion and invariant subportion of the variant portion, and separately encoded variant subportion of the variant portion are then transmitted 610 for each active frame of each transmission interval in succession thereby forming the broadcast channel signal.

Figure 7:
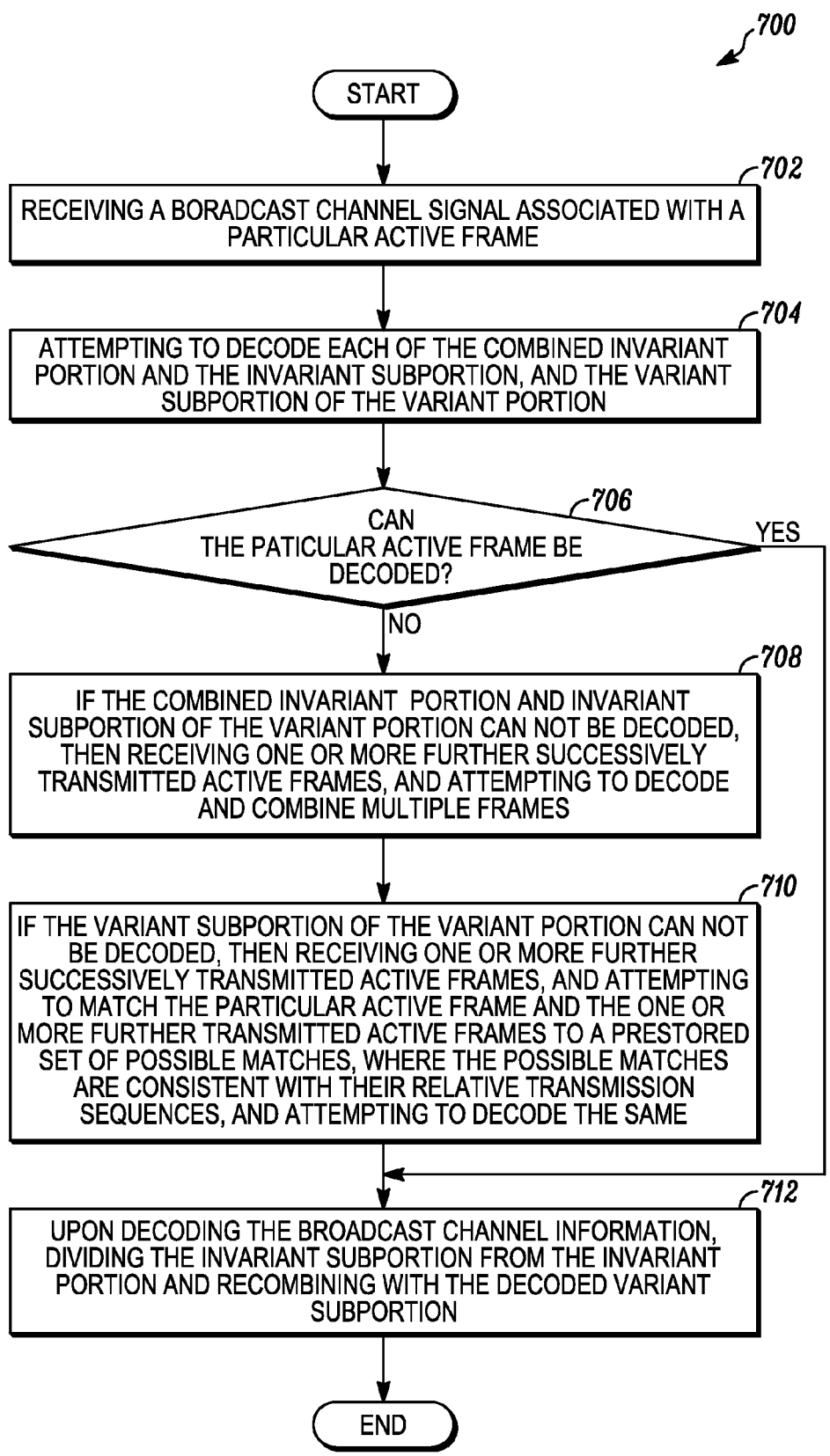
FIG. 7 is a flow diagram of a method attempting to decode one or more successively transmitted frames in a wireless communication device for a broadcast of interest in a cellular communication network, in accordance with at least a further aspect of the present invention.

FIG. 7 illustrates a flow diagram of a method 700 attempting to decode one or more successively transmitted frames in a wireless communication device for a broadcast of interest in a cellular communication network. The method includes receiving 702 a broadcast channel signal associated with a particular active frame. An attempt is made to decode 704 each of the combined invariant portion and the invariant subportion, and the variant subportion of the variant portion. A determination 706 is then made as to whether the particular active frame can be decoded.

If the combined invariant portion and invariant subportion of the variant portion can not be decoded, then one or more further successively transmitted active frames are received, and an attempt is made to decode and combine multiple frames, including the particular active frame and the one or more further successively transmitted active frames 708. If the variant subportion of the variant portion can not be decoded, then receiving one or more further successively transmitted active frames, and attempting to match the particular active frame and the one or more further transmitted active frames to a prestored set of possible matches, where the possible matches are consistent with their relative transmission sequences, and attempting to decode the same 710.

Upon decoding the broadcast channel information from the received broadcast channel signal, dividing the invariant subportion of the variant portion from the invariant portion and recombining the divided invariant subportion of the variant portion with the decoded variant subportion of the variant portion 712.

While the present application focuses on an encoding based upon a predictable difference in the encoded values between successive frames in a transmission interval based upon a known difference in the values prior to encoding, and based upon the relative position of the active frame with respect to a transmission interval boundary, the application of one or more additional encodings including some which may or may not be linear in nature are possible without departing from the teachings of the present invention. For example, it may be desirable to apply cell specific configuration, which can includes a cell specific channel interleaving and/or a cell specific channel scrambling (non-linear), in order to assist in distinguishing between different transmissions from different cellular base transceiver stations, so long as the appropriate decoding is accounted for at the receiver.

Furthermore while the present application generally refers to a mobile station, or a mobile wireless communication device, one skilled in the art will recognize the many different forms that are encompassed by such a generalized description including but not limited to cellular radio telephone, pagers, personal digital assistants, as well as other devices which support the wireless communication through their interaction with a cellular network infrastructure.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for transmitting broadcast channel information as part of a broadcast channel signal in a wireless communication system, the broadcast channel signal having one or more transmission intervals, each transmission interval including a plurality of transmissions, where one or more of the transmissions are active frames in which the broadcast channel information to be transmitted as part of each broadcast channel signal includes an invariant portion that remains static for each of the active frames within a particular transmission interval, and a variant portion that predictably changes with each successive active frame, the method comprising:
   subdividing the variant portion into an invariant subportion and a variant subportion, where the variant subportion includes at least one bit which changes value within the particular transmission interval;
   combining the invariant portion with the invariant subportion of the variant portion;
   encoding the combined invariant portion and invariant subportion of the variant portion;
   encoding the variant subportion, separate from the combined invariant portion and invariant subportion of the variant portion; and
   transmitting the encoded combined invariant portion and invariant subportion of the variant portion, and the separately encoded variant subportion for each active frame of each transmission interval in succession thereby forming the broadcast channel signal.

2. A method in accordance with claim 1, wherein upon receipt of the broadcast channel signal associated with a particular active frame, the broadcast channel information is attempted to be decoded.

3. A method in accordance with claim 2, wherein attempting to decode the broadcast channel information includes attempting to decode the combined invariant portion and invariant subportion of the variant portion, and attempting to decode the variant subportion of the variant portion.

4. A method in accordance with claim 3, wherein upon decoding the broadcast channel information dividing the invariant portion from the invariant subportion of the variant portion, and recombining the invariant subportion of the variant portion with the variant subportion of the variant portion.

5. A method in accordance with claim 3, wherein if the combined invariant portion and invariant subportion of the variant portion associated with a particular active frame can not be decoded, then receiving one or more further successively transmitted active frames, and attempting to decode and combine multiple frames including the particular active frame and the one or more further successively transmitted active frames.

6. A method in accordance with claim 3, wherein if the variant subportion of the variant portion associated with a particular active frame can not be decoded, then receiving one or more further successively transmitted active frames, and attempting to match each of the particular active frame and the one or more further successively transmitted active frames to a prestored set of possible matches based upon each of the available combination of values for the variant subportion of the variant portion, where the possible matches are consistent with the relative transmission sequence of each of the active frames, which are being attempted to be combined and the corresponding possible values.

7. A method in accordance with claim 6, wherein a number of the possible matches in the prestored set of possible matches is equal to the number of transmissions in each transmission interval.

8. A method in accordance with claim 3, wherein the variant subportion of the variant portion is encoded using one or more linear encoding techniques, and wherein a known differences between the data associated with a plurality of successively transmitted active frames within a particular transmission interval prior to encoding will produce a predictable difference between data associated with the plurality of successively transmitted active frames within a particular transmission interval after encoding.

9. A method in accordance with claim 1, further comprising aligning a beginning boundary of the transmission interval to coincide with a first transmission in the transmission interval having a mod n value of the variant portion that is equal to zero, where n is the number of transmissions in the transmission interval, and where the number of transmissions in the transmission interval has a value of 2 raised to an integer power.

10. A method in accordance with claim 9, wherein the number of bits forming the variant subportion of the variant portion is equal to the integer power that the value of 2 was raised to for identifying the number of transmissions in the transmission interval.

11. A wireless communication device comprising:
    an encoder for converting data intended to be transmitted to a broadcast channel signal, said broadcast channel signal including:
       one or more transmission intervals, each transmission interval including a plurality of transmissions, where one or more of the transmissions are active frames in which broadcast channel information to be transmitted as part of each broadcast channel signal includes an invariant portion that remains static for each of the active frames within a particular transmission interval, and a variant portion that predictably changes with each successive active frame,
       wherein the variant portion includes an invariant subportion and a variant subportion, said variant subportion being subdivided from the invariant subportion and encoded separately, and the invariant subportion is combined with the invariant portion and encoded together; and
    a transmitter for communicating the broadcast channel signal in the form of a wireless communication signal.

12. A wireless communication device in accordance with claim 11, wherein a beginning boundary of the transmission interval is aligned to coincide with a first transmission in the transmission interval having a mod n value of the variant portion that is equal to zero, where n is the number of transmissions in the transmission interval, and where the number of transmissions in the transmission interval has a value of 2 raised to an integer power.

13. A wireless communication device comprising:
    a receiver for receiving a wireless communication signal in the form of one or more transmission intervals, where each transmission interval includes a plurality of transmissions, where one or more of the transmissions are active frames; and
    a decoder for converting the received signal into data intended to be transmitted prior to an encoding for transmission, said decoder including a controller, wherein the controller is configured to attempt to decode multiple separately encoded portions of each active frame as it is received, where one separately encoded portion includes a variant portion of the data intended to be transmitted, which changes between multiple active frame transmissions within a particular transmission interval, and another separately encoded portion includes an invariant portion of the data intended to be transmitted, which does not change between multiple active frame transmissions within the particular transmission interval; and wherein part of the decoded invariant portion is associated with at least part of the decoded variant portion.

14. A wireless communication device in accordance with claim 13, wherein the wireless communication signal is a broadcast channel.

15. A wireless communication device in accordance with claim 13, wherein the controller is further configured to separately combine respective variant portions from multiple active frames, and separately combine respective invariant portions from multiple active frames, when the received wireless communication signal associated with one or more of the received active frames can not be separately decoded.

16. A wireless communication device in accordance with claim 15, wherein the controller is further configured, when decoding the respective variant portions from multiple active frames, to attempt to match each variant portion of a particular active frame and the one or more further sucessively transmitted frames to a prestored set of possible matches based upon each of the available combination of values for the variant portions, where the possible matches are consistent with the relative transmission sequence of each of the active frames, which are being attempted to be combined and the corresponding possible values, based upon an assumed decoding sequence applied to the received active frames prior to combining, where the assumed decoding sequence applied to each of the active frames is consistent with the relative received relationship of the plurality of active frames within an assumed transmission interval prior to encoding.

17. A wireless communication device in accordance with claim 13, wherein the decoder is further configured, upon decoding each of the variant portion and the invariant portion for a particular active frame, to separate the part of the decoded invariant portion associated with at least part of the variant portion from an unassociated part of the decoded invariant portion, and recombining the separated part with the at least part of the variant portion associated with the separated part.

18. A wireless communication device in accordance with claim 13, wherein the decoder includes a plurality of received signal buffers, wherein the number of received signal buffers is equal to the number of active frames in each transmission interval.

19. A wireless communication device in accordance with claim 18, wherein the earliest received active frame in the received signal buffers is assumed to be the first of the plurality of active frames transmitted in the particular transmission interval.

20. A wireless communication device in accordance with claim 13, wherein the decoder includes a timer for detecting the time interval between receipt of each active frame.

* * * * *